United States Patent
Parrish (10) Patent No.: US 11,629,001 B2
(45) Date of Patent: Apr. 18, 2023

(54) WRAPPER AND THREE-DIMENSIONAL PACKAGE WITH STEAM VENTING FEATURE FOR HOT FOOD ITEMS AND METHOD

(71) Applicant: John Edward Parrish, Matthews, NC (US)

(72) Inventor: John Edward Parrish, Matthews, NC (US)

(73) Assignee: KRUNCHY WRAP, LLC, Charlotte, NC (US)

( * ) Notice: Subject to any disclaimer, the term of this patent is extended or adjusted under 35 U.S.C. 154(b) by 599 days.

(21) Appl. No.: 16/419,360

(22) Filed: May 22, 2019

(65) Prior Publication Data

US 2020/0369451 A1 Nov. 26, 2020

(51) Int. Cl.
| | | |
|---|---|---|
| *A21D 13/30* | (2017.01) | |
| *B65D 65/20* | (2006.01) | |
| *B65D 65/40* | (2006.01) | |
| *B65D 81/20* | (2006.01) | |
| *B65D 65/04* | (2006.01) | |
| *A21D 13/32* | (2017.01) | |
| *B65D 65/42* | (2006.01) | |
| *B65D 65/22* | (2006.01) | |
| *B65D 33/01* | (2006.01) | |

(52) U.S. Cl.
CPC ......... *B65D 81/2084* (2013.01); *A21D 13/32* (2017.01); *B65D 33/01* (2013.01); *B65D 65/04* (2013.01); *B65D 65/22* (2013.01); *B65D 65/42* (2013.01); *B65D 2205/02* (2013.01)

(58) Field of Classification Search
CPC .. B65D 81/2084; B65D 81/263; B65D 65/04; B65D 65/22; B65D 65/42; B65D 65/02; B65D 2205/02; B65D 75/04; B65D 75/22; B65D 33/01; A21D 13/32
See application file for complete search history.

(56) References Cited

U.S. PATENT DOCUMENTS

| | | | | |
|---|---|---|---|---|
| 3,640,209 A | * | 2/1972 | Wilson | A47J 36/022 220/573.1 |
| 4,861,957 A | * | 8/1989 | Welles | B65D 81/3461 426/243 |
| 5,052,559 A | * | 10/1991 | Bressi, Jr. | B65D 81/261 229/906 |
| 6,120,817 A | * | 9/2000 | Archibald | B65D 33/01 426/106 |

(Continued)

*Primary Examiner* — Ericson M Lachica
(74) *Attorney, Agent, or Firm* — Shumaker, Loop & Kendrick, LLP; S. Alexander Long, Jr.

(57) ABSTRACT

A wrapper and three-dimensional package for toasted and other hot food items that includes a sheet with an array of perforations extending through the sheet material between an inner face of the sheet material adapted to contact the food item, and an opposite, outer face of the sheet material. Spicules are formed from the sheet material surrounding each of the perforations and extending away from the inner face of the sheet material. The spicules form standoffs defining an air gap between the food item and the sheet material when the food item is contained in the wrapper, with the spicules engaging an outer surface of the food item to enable lateral migration of steam from the food item, along the air gap and through the perforations.

37 Claims, 9 Drawing Sheets

(56) References Cited

U.S. PATENT DOCUMENTS

| | | | | |
|---|---|---|---|---|
| 6,187,396 B1* | 2/2001 | Moller | | B65D 33/01 |
| | | | | 428/34.3 |
| 6,359,272 B1* | 3/2002 | Sadek | | H05B 6/6494 |
| | | | | 219/730 |
| 2002/0034913 A1* | 3/2002 | Curro | | A47L 13/17 |
| | | | | 428/103 |
| 2004/0103989 A1* | 6/2004 | Lin | | B32B 3/266 |
| | | | | 428/354 |
| 2004/0175469 A1* | 9/2004 | Janecka | | A21D 13/42 |
| | | | | 426/274 |
| 2005/0269386 A1* | 12/2005 | Fisher | | B65D 65/18 |
| | | | | 229/87.08 |
| 2006/0222271 A1* | 10/2006 | Yoffe | | B65D 81/3461 |
| | | | | 383/102 |
| 2007/0087096 A1* | 4/2007 | Mir | | B65D 33/01 |
| | | | | 426/415 |
| 2007/0248291 A1* | 10/2007 | Reeves | | B65D 33/01 |
| | | | | 383/102 |
| 2008/0276571 A1* | 11/2008 | Cichowski | | B65D 33/01 |
| | | | | 383/211 |
| 2010/0230866 A1* | 9/2010 | Gray | | B29D 7/01 |
| | | | | 264/504 |
| 2013/0129883 A1* | 5/2013 | Starkey | | B65D 81/343 |
| | | | | 426/394 |
| 2013/0313251 A1* | 11/2013 | Barnoud | | A21D 17/006 |
| | | | | 219/730 |
| 2015/0216196 A1* | 8/2015 | Grier | | A47J 37/0786 |
| | | | | 426/314 |
| 2016/0038351 A1* | 2/2016 | Cecchetto | | B29C 51/082 |
| | | | | 428/134 |
| 2016/0100602 A1* | 4/2016 | Vernier | | A23C 19/08 |
| | | | | 426/412 |
| 2016/0347508 A1* | 12/2016 | VanLoocke | | B65D 33/01 |
| 2019/0039018 A1* | 2/2019 | Rodriguez | | A61L 9/16 |
| 2019/0039805 A1* | 2/2019 | Schur | | B65D 81/3266 |

\* cited by examiner

WRAPPER AND THREE-DIMENSIONAL PACKAGE WITH STEAM VENTING FEATURE FOR HOT FOOD ITEMS AND METHOD

TECHNICAL FIELD AND BACKGROUND OF THE INVENTION

The present invention relates to a wrapper for hot food items where the wrapper relatively tightly encloses the hot food item. Wrappers are commonly used to wrap hot food items such as toasted sandwiches, wraps, gyros, tacos, hamburgers, hot dogs, french fries, among others. The wrapper retains heat, maintains the components of the food item together and in an integrated proper position in relation to each for eating, and helps to maintain the food item in a sanitary, edible condition.

Fast food restaurants typically wrap hot food items such as sandwiches whether the customer intends to eat in the restaurant or take the food item out of the restaurant for consumption elsewhere. In cafés and more upscale restaurants hot food items such as sandwiches served for consumption in the restaurant are not wrapped, but when ordered for take-out are typically wrapped in foil or paper and/or boxed. In the latter instances a problem is created in that the toasted or otherwise hot food item when wrapped quickly becomes soggy and unappetizing because the steam trapped in the hot food item condenses on the inner surface of the wrapper and is quickly reabsorbed into the cooling food item.

Food wrappers with large holes are known, but are unsatisfactory. The punched large holes, which are typically punched in the same manner as notebook paper, result in a chad that has to be disposed of. The large holes cause more rapid cooling, allow crumbs to fall from the food item through the holes and can result in an unsanitary product exposed to soiled hands or other contaminants.

Therefore, there is a need for a wrapper that meets all of the requirements for hot food containment and also solves the problems described above by preserving the freshness and crispness of hot food items, particularly but not exclusively those that are toasted, fried or otherwise crisp rather than soft.

Therefore, it is an object of the invention to provide a wrapper for hot food items that is perforated with a very large number of very small perforations that allow steam to quickly exit the interior of the wrapper.

It is yet another object of the invention to provide a wrapper for hot food items that prevents crumbs and other small bits of the food item from exiting the wrapper through holes in the wrapper.

It is yet another object of the invention to provide a wrapper for hot food items that maintains the food item in a sanitary condition before and during consumption.

It is yet another object of the invention to provide a hot food item that is contained in a wrapper that permits the crisp, appetizing condition of a hot food item to be retained until consumption, prevents bits of the food item from exiting through holes in the wrapper, and maintains the food item in a sanitary condition before and during consumption.

It is yet another object of the invention to provide a method for wrapping hot food items in a series of steps that permits the crisp, appetizing condition of a hot food item to be retained until consumption, prevents bits of the food item from exiting through holes in the wrapper, and maintains the food item in a sanitary condition before and during consumption.

It is yet another object of the invention to provide a hot food product that includes a wrapper and a wrapped hot food item wherein the wrapper permits the crisp, appetizing condition of the hot food item to be retained until consumption, prevents bits of the food item from exiting through holes in the wrapper, and maintains the food item in a sanitary condition before and during consumption.

These and other objects and advantages of the invention are achieved by providing a wrapper for toasted and other hot food items that includes a sheet material for use in forming a protective wrapping around the food item with an array of perforations extending through the sheet material between an inner face of the sheet material adapted to contact the food item, and an opposite, outer face of the sheet material. A plurality of spicules is formed from the sheet material that surrounds each of the perforations and extends away from the inner face of the sheet material. The spicules are adapted to form standoffs defining an air gap between the food item and the sheet material when the food item is contained in the wrapper, with the spicules engaging an outer surface of the food item to enable lateral migration of steam from the food item, along the air gap and through the perforations.

According to another embodiment of the invention, the thickness of the sheet material between perforations is about 160 microns.

According to another embodiment of the invention, the wrapper is a silicone coated paper.

According to another embodiment of the invention, the perforations have a diameter of between 250 and 300 microns and the spicules have a length of about 125-150 microns.

According to another embodiment of the invention, the sheet has between about 31 and 50 perforations/cm$^2$.

According to another embodiment of the invention, the thickness of the sheet material between perforations is about 160 microns, the wrapper is a silicone coated paper, the perforations have a diameter of between 250 and 300 microns and the spicules have a length of about 125-150 microns and the sheet has between about 31 and 50 perforations/cm$^2$.

According to another embodiment of the invention, a wrapper for toasted and other hot food items is provided, and includes a sheet material for use in forming a protective wrapping around the food item, and an array of punched holes extending through the sheet material between an inner face of the sheet material adapted to contact the food item, and an opposite, outer face of the sheet material, the holes having diameter of between about 1 and 3 mm and a spacing of about 2-3 holes/cm$^2$.

According to another embodiment of the invention, a wrapped hot food product is provided that includes a hot food item and a wrapper formed of a sheet material forming a protective wrapping around the hot food item. An array of perforations extends through the sheet material between an inner face of the sheet material contacting the hot food item, and an opposite, outer face of the sheet material. A plurality of spicules is formed from the sheet material surrounding each of the perforations and extends away from the inner face of the sheet material. The spicules form standoffs defining an air gap between the hot food item and the sheet material with the spicules engaging an outer surface of the hot food item to enable lateral migration of steam from the hot food item along the air gap and through the perforations.

According to another embodiment of the invention, the hot food item is toasted.

According to another embodiment of the invention, the toasted hot food item is a bread sandwich.

According to another embodiment of the invention, the hot food item is selected from the group consisting of sandwiches, wraps, tacos, gyros, hamburgers and hot dogs.

According to another embodiment of the invention, a method of forming a wrapped hot food product is provided that maintains crispness and freshness for an extended time, and includes the steps of forming a wrapper sized for wrapping a hot food item that includes the steps of providing a sheet material for use in forming a protective wrapping around the hot food item, forming an array of perforations extending through the sheet material between an inner face of the sheet material adapted to contact the hot food item, and an opposite, outer face of the sheet material. The perforations include a plurality of spicules formed from the sheet material that surround each of the perforations and extend away from the inner face of the sheet material. The spicules form standoffs defining an air gap between the hot food item and the sheet material when the hot food item is contained in the wrapper. A hot food item is placed on inner face of the sheet material and the sheet material is folded around the hot food item with the spicules engaging an outer surface of the hot food item to enable lateral migration of steam from the hot food item, along the air gap and through the perforations.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DETAILED DESCRIPTION OF A PREFERRED EMBODIMENT AND BEST MODE

Figure 1:
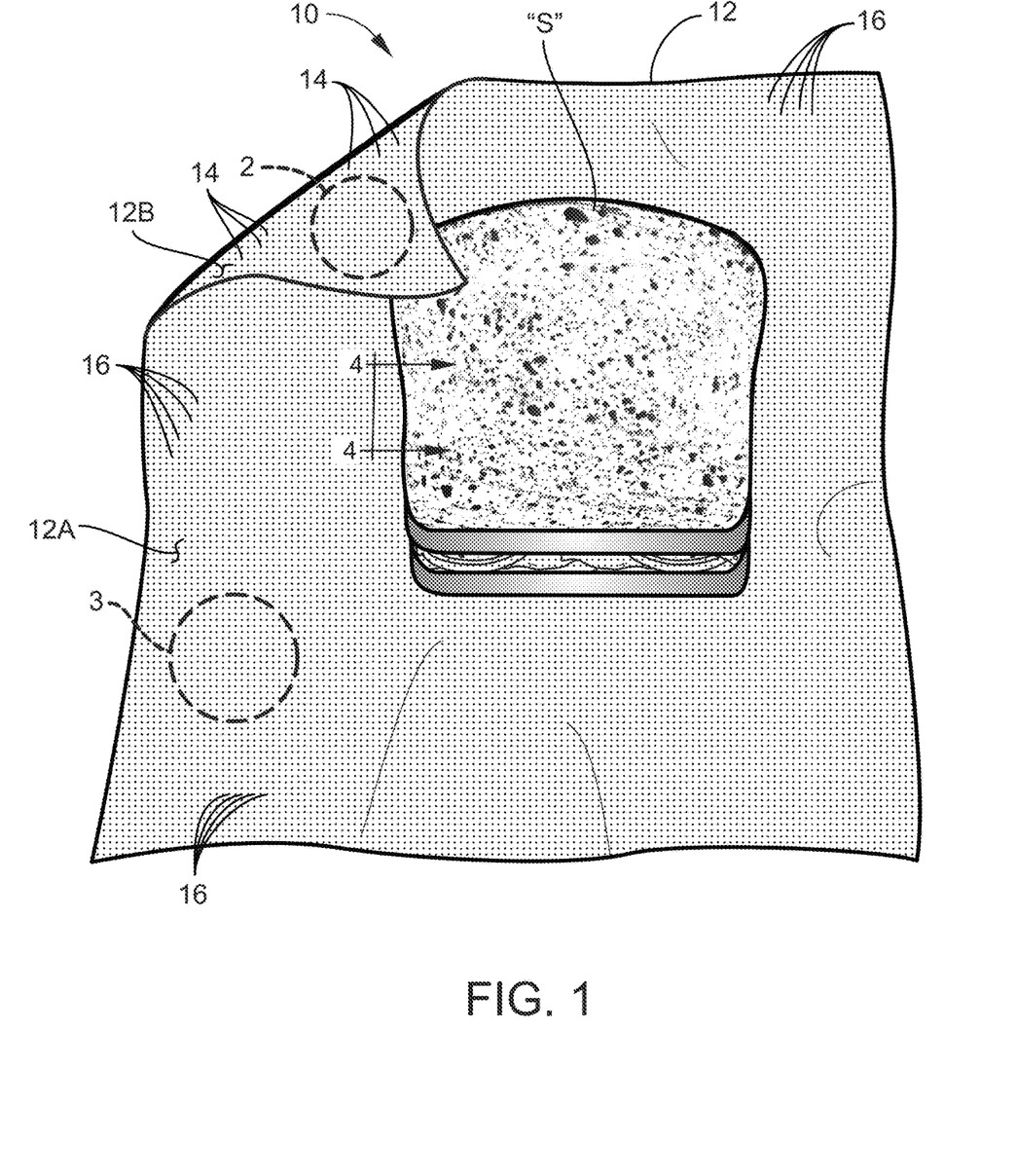
FIG. 1 is an environmental view of a toasted sandwich hot food item positioned on an open wrapper according to one preferred embodiment of the invention.
Figures 2, 3:
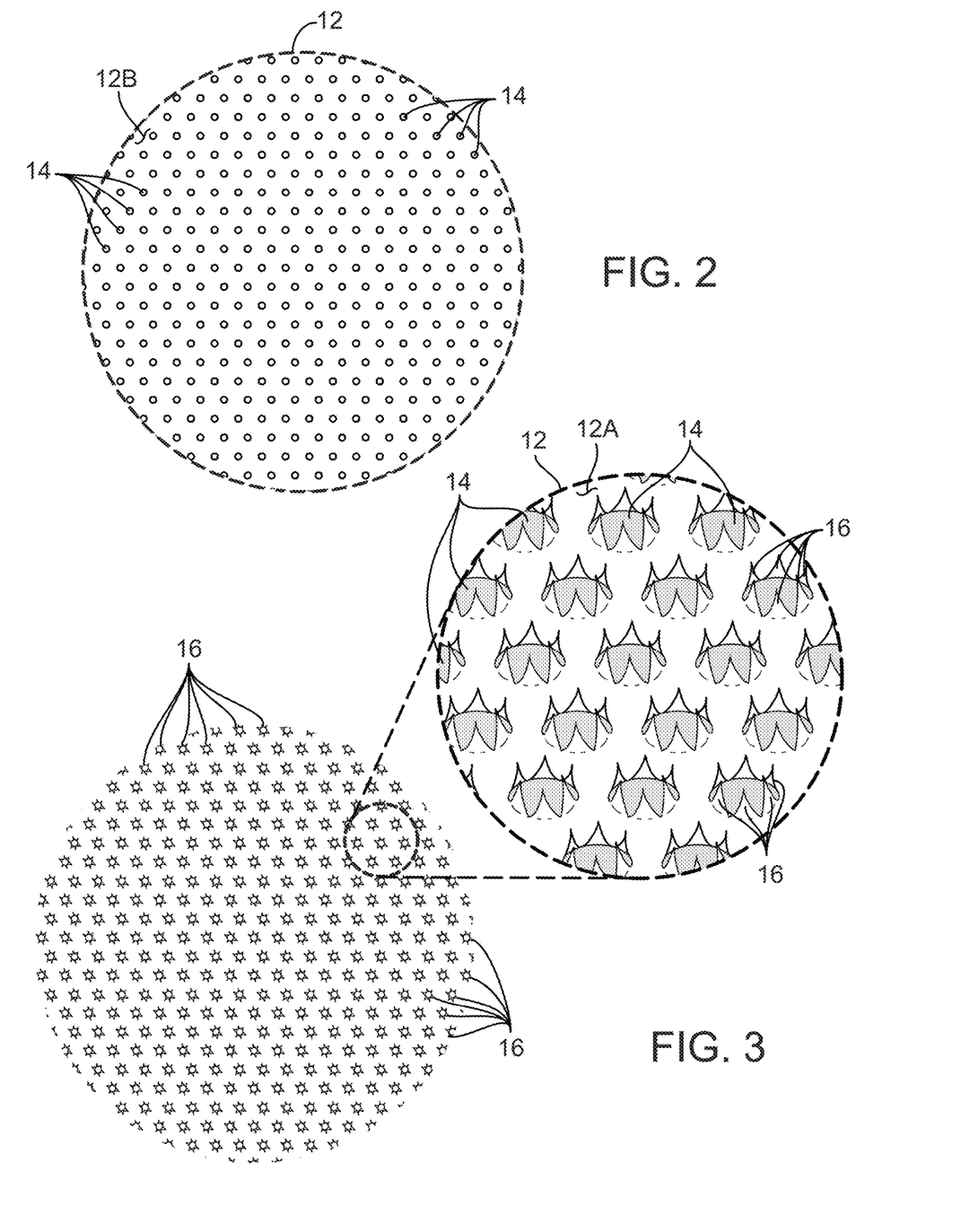
FIG. 2 is a fragmentary enlarged view of area 2 of FIG. 1.
FIG. 3 is a fragmentary enlarged view of area 3 of FIG. 1.
Figure 4:
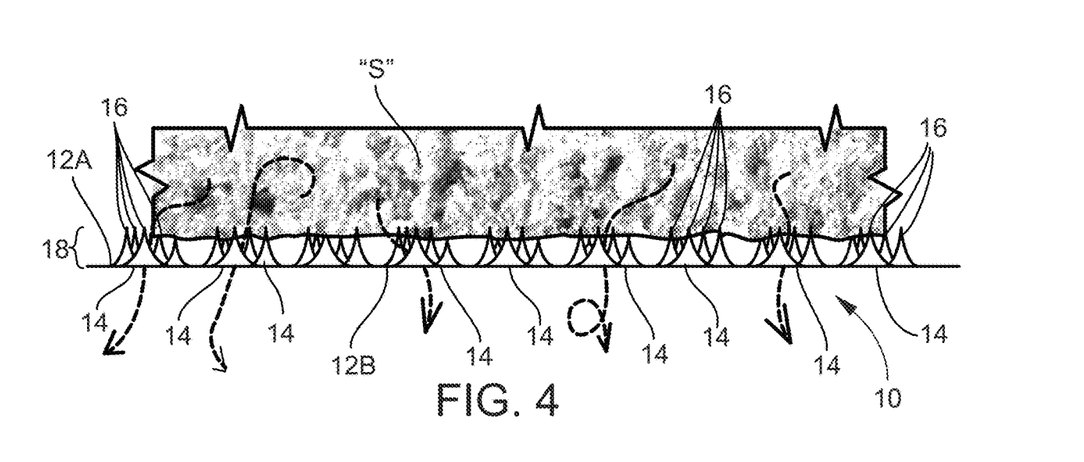
FIG. 4 is a side elevation of a wrapper according to one preferred embodiment of the invention with a fragmentary sandwich portion sitting on the wrapper in preparation for being wrapped.

Referring now to FIGS. 1-5, a sandwich "S" is shown, and is representative of the types of hot food items that can usefully be wrapped in a wrapper 10 as shown. The wrapper 10 is formed of a sheet 12 having an inner surface 12A and an outer surface 12B, which may be any food grade paper conventionally used for wrapping food items such as sandwiches. The sheet 12 is perforated with a multitude of very small spaced-apart perforations 14 through which steam given off by a hot food item such as a sandwich is allowed to quickly vent. As shown in FIGS. 1, 2 and 4, the perforated sheet 12 defines a series of upstanding spicules 16 that surround each perforation 14. These spicules 16 extend outwardly from the inner surface 12A of the sheet 12, and with the surrounding areas of the sheet 12 define the inner surface 12A of the wrapper 10. As shown in FIG. 4, the spicules 16 have the effect of spacing the sandwich "S" very slightly away from the inner surface 12A of the sheet 12 to form an air gap 18 through which steam can laterally move from the sandwich "S" to a perforation 14 where it is vented to the outside of the wrapper 10. The higher vapor pressure of the steam and the air gap 18 permit a much larger percentage of the moisture trapped in the wrapper 10 to quickly vent, in contrast to the steam condensing on the inner surface of a solid wrapper and then reabsorbing back into the sandwich. See FIG. 5.

Figure 5:
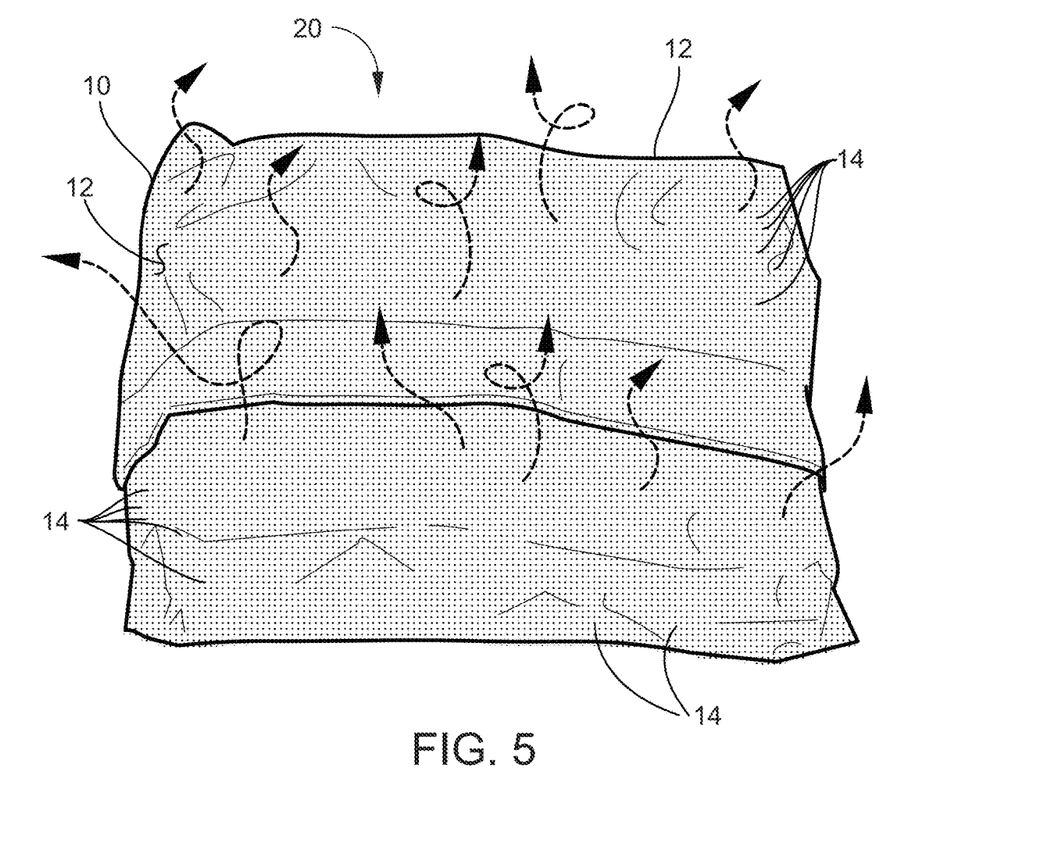
FIG. 5 is a perspective view of the sandwich hot food item of FIGS. 1 and 4 after being wrapped to form a wrapped hot food product.

Forming a wrapper 10 according to the steps set out above and wrapping the sandwich "S" in the wrapper 10 results in a hot food product 20 formed of the sandwich "S" wrapped in the wrapper 10. The sandwich "S" has enhanced appearance, appetizing mouth feel and taste resulting from retained crispness and freshness due to rapid and more complete steam venting.

An example of the technical and physical characteristics of a preferred embodiment of the wrapper 10 is set out below:

| | |
|---|---|
| Wrapper sheet 10 | Food Grade panliner paper with silicone coating on one side, GFSI Compliant<br>Sheet thickness approx. 160 microns<br>Sheet weight 27 lbs./500 sheets, 24 in × 36 in<br>12 kg/500 sheets, 61 cm × 91 cm |
| Perforations 14 | up to approx. 320/in$^2$ (50/cm$^2$) |
| Perforation 14 | diameter approx. 250-300 microns |
| Spicule 16 height | approx. 125-150 microns |

The above example is one of many alternatives that are suitable. Perforation 14 size may vary, which in turn determines the length of the spicules 16 that form the air gap 18. Similarly, the number and spacing of the perforations 14 may vary, the important consideration being the ability of steam to rapidly vent through the perforations 14 before it condenses on the inner surface 12A of the sheet 12.

Referring now to FIGS. 6-10, a sandwich "S" is shown, and is representative of the types of hot food items that can usefully be wrapped in a wrapper 30 as shown. The wrapper 30 is formed of a sheet 32 having an inner surface 32A and an outer surface 32B, which may be any food grade paper conventionally used for wrapping food items such as sandwiches. The sheet 32 is punched with a multitude of spaced-apart holes 34 through which steam given off by a hot food item such as a sandwich is allowed to quickly vent. As shown, the punched sheet 32 is devoid of chads, and both the inner surface 32A and outer surface 32B are essentially flat.

Figure 9:
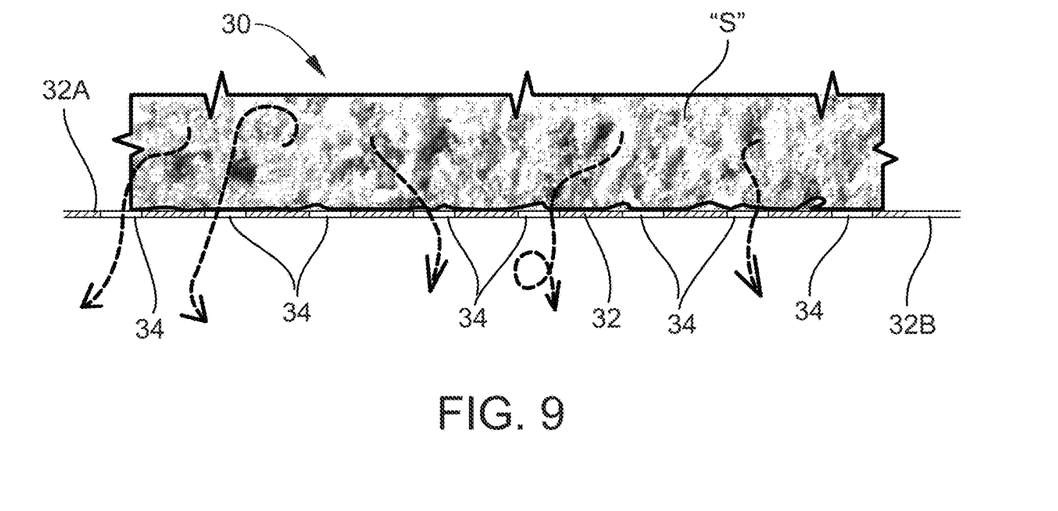
FIG. 9 is a side elevation of a wrapper according to the preferred embodiment of FIG. 6 with a sandwich hot food item sitting on the wrapper for being wrapped.
Figure 10:
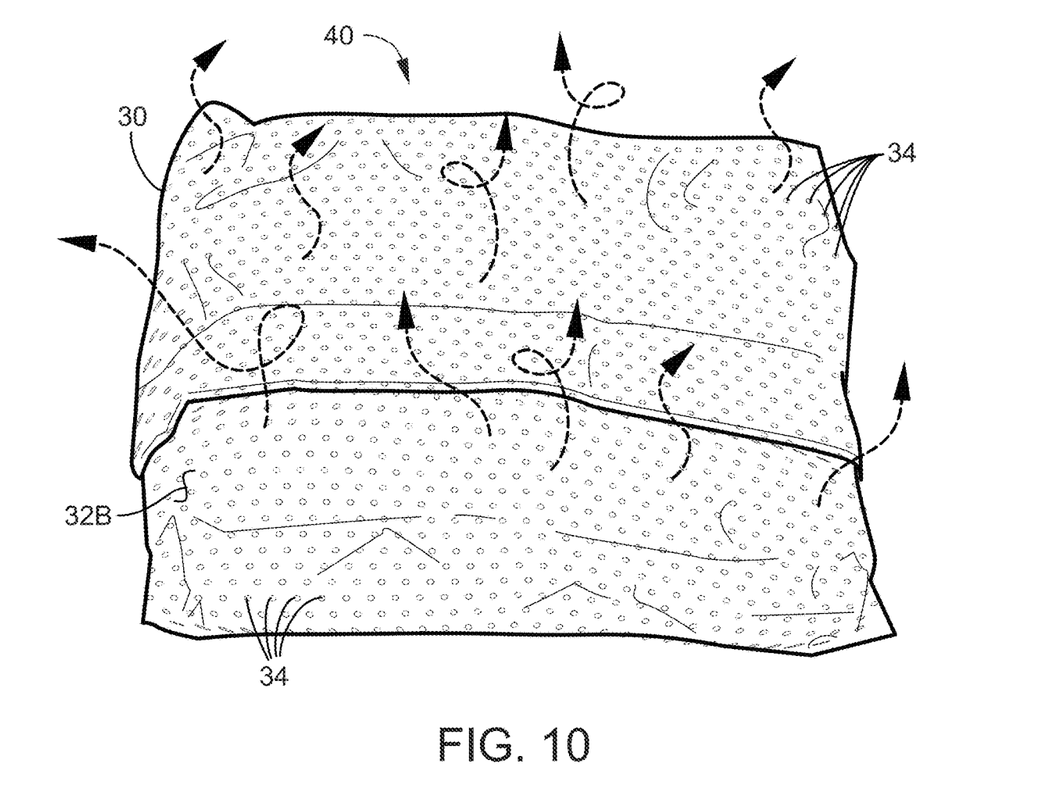
FIG. 10 is a perspective view of the sandwich hot food item of FIGS. 6 and 9 after being wrapped to form a wrapped hot food product.
Figure 11:
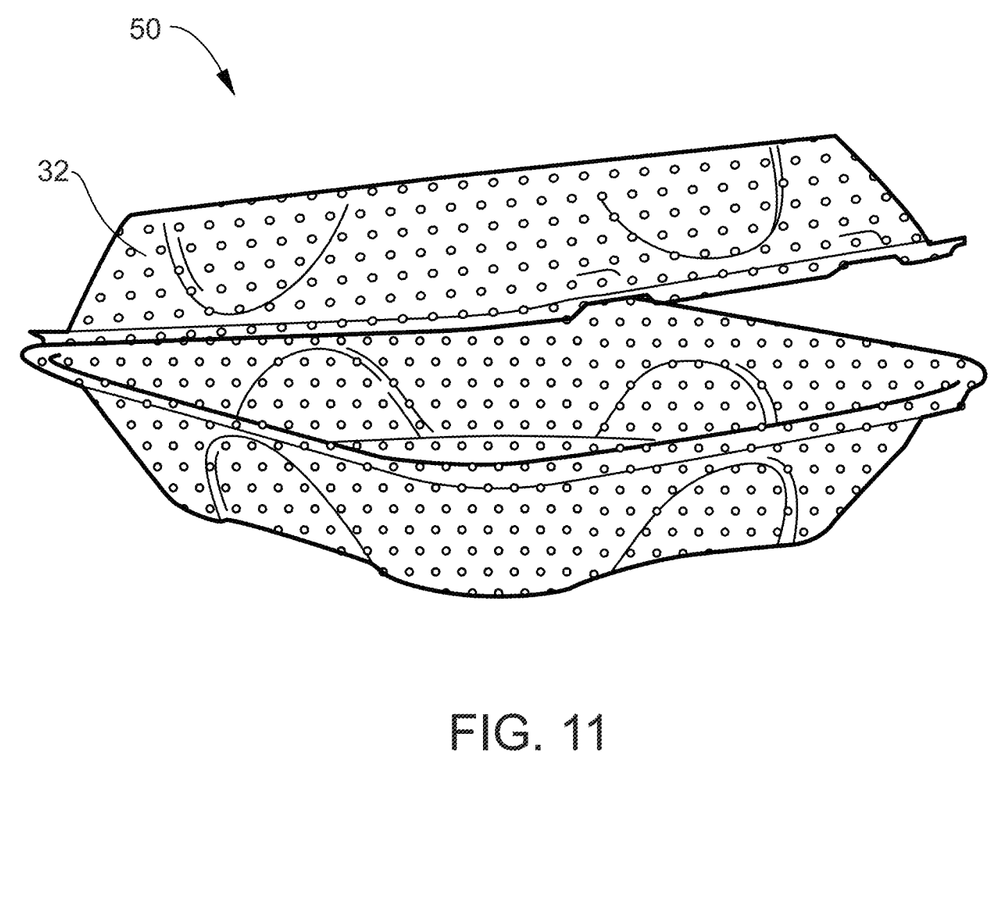
FIG. 11 is a three-dimensional package in the form of a clam shell type container.
Figures 12, 13, 14:
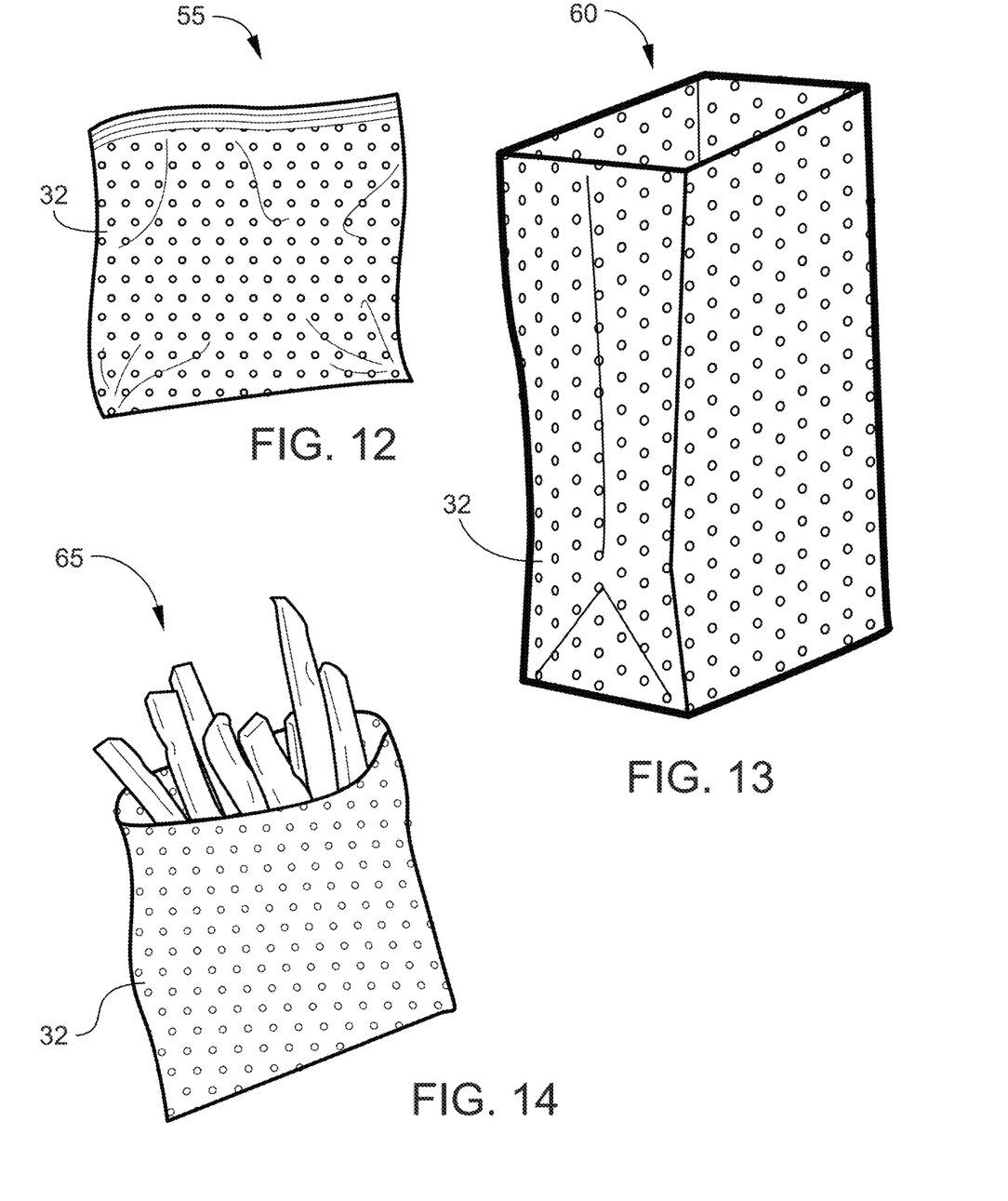
FIG. 12 is a three-dimensional package in the form of a resealable bag.
FIG. 13 is a three-dimensional package in the form of an open top bag.
FIG. 14 is a three-dimensional package in the form of a pouch.
Figure 15:
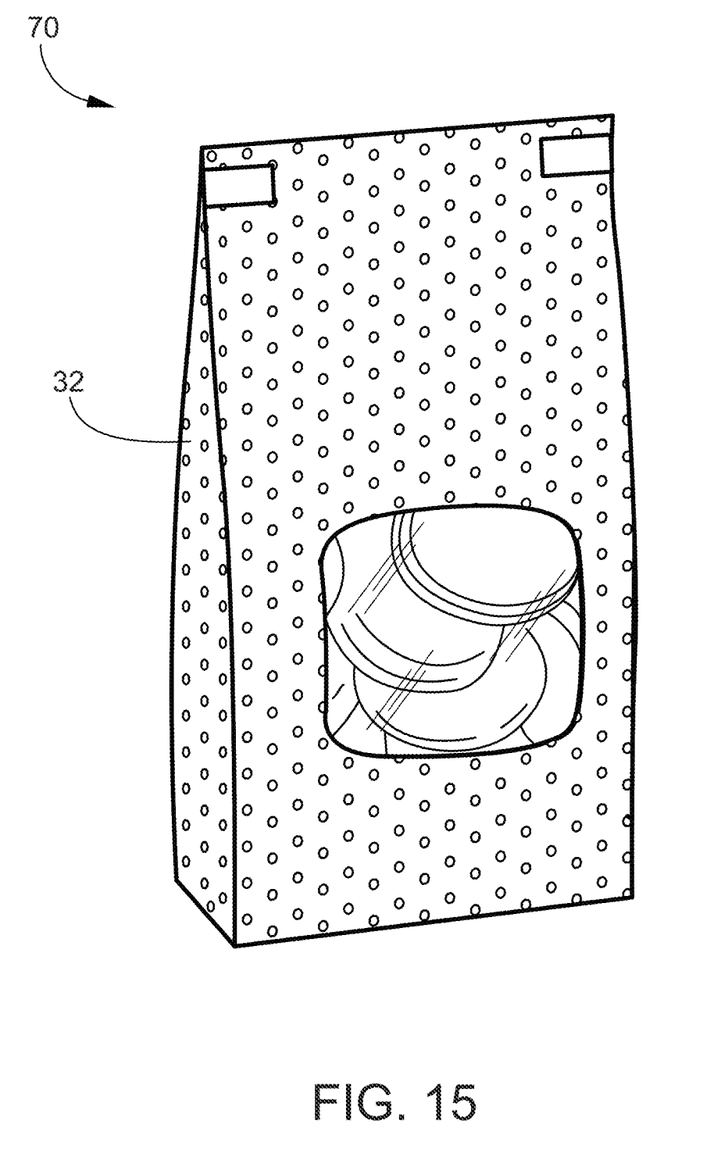
FIG. 15 is a three-dimensional package in the form of a reclosable bag.

As shown in FIGS. 9 and 10, the holes 34 reside next to the outer surface of the sandwich "S" and allow stream to move from the sandwich "S" to a hole 34 where it is vented to the outside of the wrapper 10. As shown in FIG. 9, the outer surface of the sandwich "S" is somewhat irregular to a degree dependent on the characteristics of the bread from which the sandwich "S" is constructed. This surface irregularity forms serpentine pathways along the outer surface of the sandwich "S" along which steam, due to its relatively higher vapor pressure, can migrate to the nearest hole 34 to be vented. While not as efficient as the wrapper 10 at venting steam to the exterior, strategic size and placement of the holes 34 permit a degree of enhanced crispness for toasted and other hot food items to be maintained.

Figure 6:
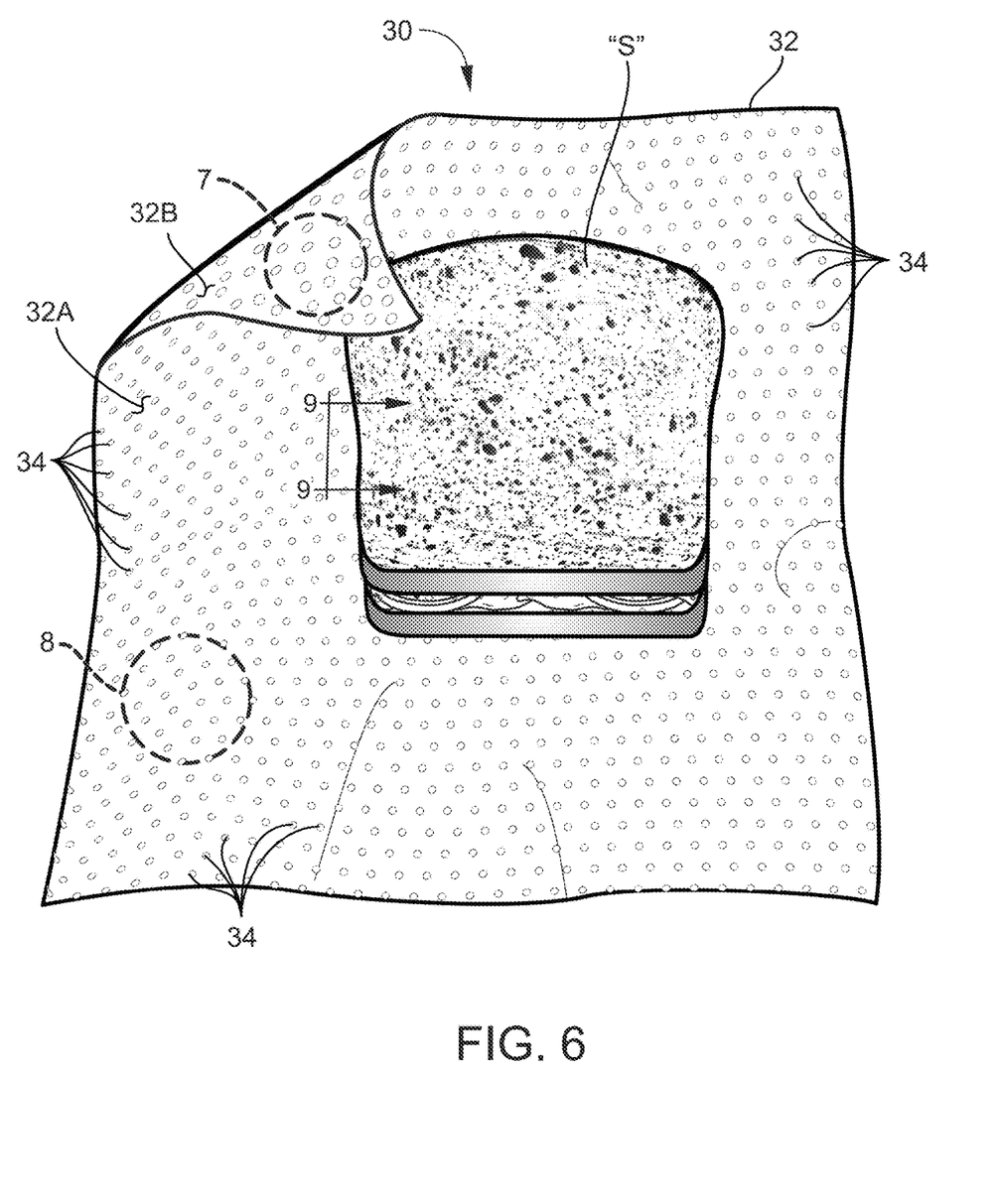
FIG. 6 is an environmental view of a toasted sandwich hot food item positioned on an open wrapper according to another preferred embodiment of the invention.
Figures 7, 8:
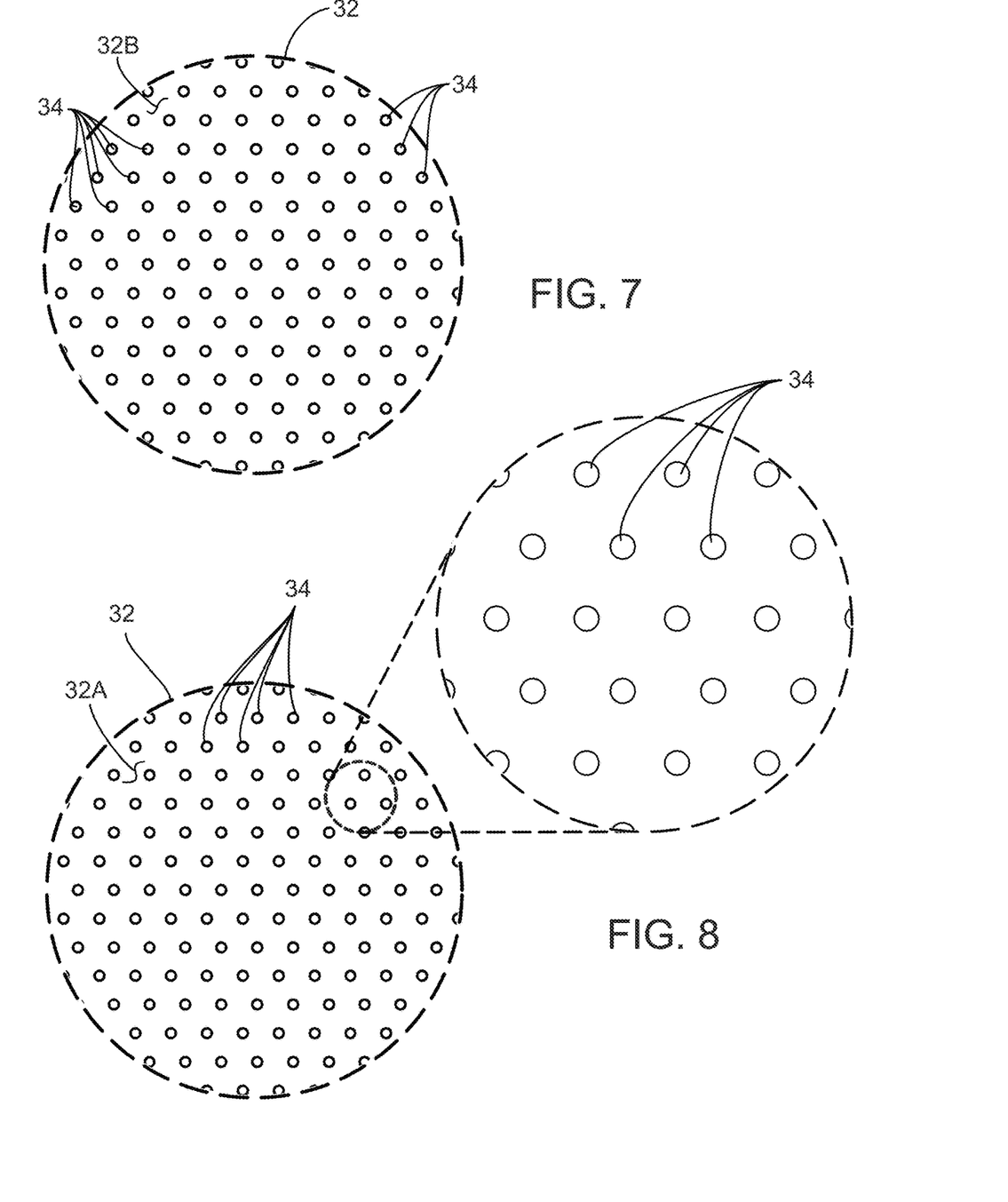
FIG. 7 is a fragmentary enlarged view of area 7 of FIG. 6.
FIG. 8 is a fragmentary enlarged view of area 8 of FIG. 6.

Forming a wrapper 30 according to the steps set out above and wrapping the sandwich "S" in the wrapper 30 results in a hot food product 40 formed of the sandwich "S" wrapped in the wrapper 30. The sandwich "S" has enhanced appearance, appetizing mouth feel and taste resulting from retained crispness and freshness due to rapid and more complete steam venting.

An example of the technical and physical characteristics of a preferred embodiment of the wrapper 30 is set out below:

| | |
|---|---|
| Wrapper sheet 30 | Food Grade panliner paper with silicone coating on one side, GFSI Compliant |
| Sheet thickness approx. | 160 microns |
| Sheet weight | 27 lbs./500 sheets, 24 in × 36 in (12 kg/500 sheets, 61 cm × 91 cm) |
| Hole 34 open area | 3-50 percent |
| Hole 34 density | up to approx. 320/in2 (50/cm2) |
| Hole 34 | diameter approx. 50-300 microns |

The above example is one of many alternatives that are suitable. Hole size and spacing may vary, the important consideration being the ability of steam to rapidly vent through the holes 34 before it condenses on the inner surface 32A of the sheet 32.

With both the embodiment of FIGS. 1-5 and 6-10, other options are within the scope of the invention. For example, other wrapping materials such as non-silicone layered papers, foils, butcher paper, parchment paper, hot paper, laminated foil/paper products, quilted sandwich wrap and similar products may be adapted within the scope of the invention.

The term "hot food item" is intended to be and is used broadly to include any hot food item, including categories not specifically referenced in this application, that are a crisp texture that will soften if exposed to steam. The specific food categories are only illustrative of the variety of food products that may advantageously kept in a crisp, fresh condition using the teachings of the invention. This includes toasted, fried, sautéed and other cooking techniques that impart a crisp outer coat to the food product. Deep fried or skillet fried potatoes, mushrooms, okra and similar vegetables, crisp fried meats, cheeses and similar products are included in this broad usage.

While the disclosure of this application is directed to embodiments of wrappers that include flat sheets that are folded to enclose the hot food items, other shapes and constructions are also possible using perforated sheets from which packages, which may be three-dimensional, are created and adapted to hold specific categories of hot food items. The packages may be pre-constructed and ready for use, or fabricated to be constructed at the time of use from a pre-cut, pre-assembled package precursor.

By way of further example, FIGS. 11-15 illustrate five such three-dimensional packages—a rigid clamshell 50 (FIG. 11), a resealable bag 55 (FIG. 12), an open top bag 60 (FIG. 13); a flat, openable pouch 65 (FIG. 14) and a reclosable bag 70 (FIG. 15), each of which are adapted to hold specific categories of hot food items. In each case the items are fabricated of the sheet 32, although sheet 12 can also be used, as well as any other suitable sheet material within the scope of this invention. The packages may be pre-constructed and ready for use, or fabricated to be constructed at the time of use from a pre-cut, pre-assembled package precursor.

The size, spacing and shape of the perforations, spicules and similar features discussed in this application are also applicable to these other related embodiments.

A hot food wrapper, a method of forming a hot food wrapper and a hot food/wrapper product combination are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A wrapper for a hot food item, the wrapper comprising:
a sheet material for use in forming a protective wrapping around the hot food item, the sheet material including an inner face configured to face towards the hot food item;
a plurality of perforations extending through the sheet material, each of the plurality of the perforations surrounded by a plurality of spicules, each of the plurality of the spicules formed by a bent portion of the sheet material, each of the plurality of the spicules defining an air gap between the hot food item and the inner face of the sheet material when each of the plurality of the spicules engages an outer surface of the hot food item to enable lateral migration of steam from the hot food item, along the air gap, and through the plurality of the perforations, wherein each of the plurality of the spicules is triangular in shape and includes a first vertex, a second vertex, a third vertex, a first side extending between the first vertex and the second vertex, a second side extending between the second vertex and the third vertex, and a third side extending between the first vertex and the third vertex, wherein the first side of each of the plurality of the spicules is formed by an edge where the corresponding one of the plurality of the spicules is bent to project away from the inner face of the sheet material, wherein the first vertex, the second vertex, and the first side of each of the plurality of the spicules define a portion of a circumference of a corresponding one of the plurality of the perforations, and wherein the second side and the third side of each of the plurality of the spicules meet at the corresponding third vertex thereof at a position spaced apart from the corresponding first side thereof and the circumference of the corresponding one of the plurality of the perforations.

2. The wrapper according to claim 1, wherein the thickness of the sheet material is about 160 microns.

3. The wrapper according to claim 1, wherein the wrapper is a silicone coated paper.

4. The wrapper according to claim 1, wherein each of the plurality of the perforations has a diameter of between 250 and 300 microns and each of the plurality of the spicules has a length of about 125-150 microns, wherein the length of each of the plurality of the spicules corresponds to a distance from the first side thereof to the third vertex thereof along an axis arranged perpendicular to the first side thereof and extending through the third vertex thereof.

5. The wrapper according to claim 1, wherein the sheet material has between about 31 and 50 perforations/cm$^2$.

6. The wrapper according to claim 1, wherein the thickness of the sheet material is about 160 microns, the wrapper is a silicone coated paper, each of the plurality of the perforations has a diameter of between 250 and 300 microns and each of the plurality of the spicules has a length of about 125-150 microns, and the sheet material has between about 31 and 50 perforations/cm$^2$, and wherein the length of each of the plurality of the spicules corresponds to a distance from the first side thereof to the third vertex thereof along an axis arranged perpendicular to the first side thereof and extending through the third vertex thereof.

7. A wrapper for a hot food item, the wrapper comprising:
a sheet material for use in forming a protective wrapping around the hot food item;
a plurality of holes extending through the sheet material between an inner face of the sheet material adapted to contact the hot food item, and an opposite, outer face of the sheet material, each of the plurality of the holes surrounded by a plurality of spicules, each of the plurality of the spicules formed by a bent portion of the sheet material extending in a direction the inner face of the sheet material faces, wherein each of the plurality of the spicules is triangular in shape and includes a first vertex, a second vertex, a third vertex, a first side extending between the first vertex and the second vertex, a second side extending between the second vertex and the third vertex, and a third side extending between the first vertex and the third vertex, wherein the first side of each of the plurality of the spicules is formed by an edge where the corresponding one of the plurality of the spicules is bent to project away from the inner face of the sheet material, wherein the first vertex, the second vertex, and the first side of each of the plurality of the spicules define a portion of a circumference of a corresponding one of the plurality of the holes, and wherein the second side and the third side of each of the plurality of the spicules meet at the corresponding third vertex thereof at a position spaced apart from the corresponding first side thereof and the circumference of the corresponding one of the plurality of the holes; and
each of the plurality of the holes having a diameter of between about 1 and 3 mm, and the sheet material having a spacing of about 2-3 holes/cm$^2$.

8. The wrapper according to claim 7, wherein the thickness of the sheet material is about 160 microns.

9. The wrapper according to claim 7, wherein the wrapper is a silicone coated paper.

10. A wrapped hot food product, comprising:
a hot food item;
a wrapper formed of a sheet material forming a protective wrapping around the hot food item, the sheet material including an inner face configured to face towards the hot food item;
a plurality of perforations extending through the sheet material, each of the plurality of the perforations surrounded by a plurality of spicules, each of the plurality of the spicules formed by a bent portion of the sheet material, each of the plurality of the spicules defining an air gap between the hot food item and the inner face of the sheet material when each of the plurality of the spicules engages an outer surface of the hot food item to enable lateral migration of steam from the hot food item, along the air gap, and through the plurality of the perforations, wherein each of the plurality of the spicules is triangular in shape and includes a first vertex, a second vertex, a third vertex, a first side extending between the first vertex and the second vertex, a second side extending between the second vertex and the third vertex, and a third side extending between the first vertex and the third vertex, wherein the first side of each of the plurality of the spicules is formed by an edge where the corresponding one of the plurality of the spicules is bent to project away from the inner face of the sheet material, wherein the first vertex, the second vertex, and the first side of each of the plurality of the spicules define a portion of a circumference of a corresponding one of the plurality of the perforations, and wherein the second side and the third side of each of the plurality of the spicules meet at the corresponding third vertex thereof at a position spaced apart from the corresponding first side thereof and the circumference of the corresponding one of the plurality of the perforations.

11. The wrapped hot food product according to claim 10, wherein the hot food item is toasted.

12. The wrapped hot food product according to claim 11, wherein the toasted hot food item is a bread sandwich.

13. The wrapped hot food product according to claim 10, wherein the hot food item is selected from the group consisting of sandwiches, wraps, tacos, gyros, hamburgers, hot dogs, french fries, and crisp fried meats, vegetables and cheeses.

14. A three dimensional package for a hot food item, the three-dimensional package comprising:
a sheet material defining the three dimensional package for providing at least partial protection to the hot food item, the sheet material including an inner face configured to face towards the hot food item when the hot food item is contained in the three dimensional package;
the three dimensional package including a plurality of perforations extending through the sheet material, each of the plurality of the perforations surrounded by a plurality of spicules, each of the plurality of the spicules formed by a bent portion of the sheet material, each of the plurality of the spicules defining an air gap between the hot food item and the inner face of the sheet material when each of the plurality of the spicules engages an outer surface of the hot food item to enable lateral migration of steam from the hot food item, along the air gap, and through the plurality of the perforations, wherein each of the plurality of the spicules is triangular in shape and includes a first vertex, a second vertex, a third vertex, a first side extending between the first vertex and the second vertex, a second side extending between the second vertex and the third vertex, and a third side extending between the first vertex and the third vertex, wherein the first side of each of the plurality of the spicules is formed by an edge where the corresponding one of the plurality of the spicules is bent to project away from the inner face of the sheet material, wherein the first vertex, the second vertex, and the first side of each of the plurality of the spicules define a portion of a circumference of a corresponding one of the plurality of the perforations, and wherein the second side and the third side of each of the plurality of the spicules meet at the corresponding third vertex thereof at a position spaced apart from the corresponding first side thereof and the circumference of the corresponding one of the plurality of the perforations.

15. The three dimensional package according to claim 14, wherein the thickness of the sheet material is about 160 microns.

16. The three dimensional package according to claim 14, wherein the sheet material is a silicone coated paper.

17. The three dimensional package according to claim 14, wherein each of the plurality of the perforations has a diameter of between 250 and 300 microns and each of the plurality of the spicules has a length of about 125-150 microns, wherein the length of each of the plurality of the spicules corresponds to a distance from the first side thereof to the third vertex thereof along an axis arranged perpendicular to the first side thereof and extending through the third vertex thereof.

18. The three dimensional package according to claim 14, wherein the sheet material has between about 31 and 50 perforations/cm$^2$.

19. The three dimensional package according to claim 14, wherein the thickness of the sheet material is about 160 microns, the sheet material is a silicone coated paper, each of the plurality of the perforations has a diameter of between 250 and 300 microns, each of the plurality of the spicules has a length of about 125-150 microns, and the sheet material has between about 31 and 50 perforations/cm$^2$, wherein the length of each of the plurality of the spicules corresponds to a distance from the first side thereof to the third vertex thereof along an axis arranged perpendicular to the first side thereof and extending through the third vertex thereof.

20. A three dimensional package for a hot food item, the three dimensional package comprising:
    a sheet material for use in forming the three dimensional package for providing at least partial protection to the hot food item;
    a plurality of holes extending through the sheet material between an inner face of the sheet material adapted to contact the food item, and an opposite, outer face of the sheet material, each of the plurality of the holes surrounded by a plurality of spicules, each of the plurality of the spicules formed by a bent portion of the sheet material extending in a direction the inner face of the sheet material faces, wherein each of the plurality of the spicules is triangular in shape and includes a first vertex, a second vertex, a third vertex, a first side extending between the first vertex and the second vertex, a second side extending between the second vertex and the third vertex, and a third side extending between the first vertex and the third vertex, wherein the first side of each of the plurality of the spicules is formed by an edge where the corresponding one of the plurality of the spicules is bent to project away from the inner face of the sheet material, wherein the first vertex, the second vertex, and the first side of each of the plurality of the spicules define a portion of a circumference of a corresponding one of the plurality of the holes, and wherein the second side and the third side of each of the plurality of the spicules meet at the corresponding third vertex thereof at a position spaced apart from the corresponding first side thereof and the circumference of the corresponding one of the plurality of the holes; and
    the plurality of holes having a diameter of between about 1 and 3 mm and a spacing of about 2-3 holes/cm$^2$.

21. The three dimensional package according to claim 20, wherein the thickness of the sheet material is about 160 microns.

22. The three dimensional package according to claim 20, wherein the sheet material is a silicone coated paper.

23. A method of forming a wrapped hot food item, the method comprising the steps of:
    (a) forming a wrapper sized for wrapping the hot food item that includes the steps of providing a sheet material for use in forming a protective wrapping around the hot food item;
    forming a plurality of perforations extending through the sheet material between an inner face of the sheet material adapted to contact the hot food item, and an opposite, outer face of the sheet material, wherein each of the plurality of the perforations is surrounded by a plurality of spicules, wherein each of the plurality of the spicules is formed by a bent portion of the sheet material extending in a direction the inner face of the sheet material faces, wherein each of the plurality of the spicules is triangular in shape and includes a first vertex, a second vertex, a third vertex, a first side extending between the first vertex and the second vertex, a second side extending between the second vertex and the third vertex, and a third side extending between the first vertex and the third vertex, wherein the first side of each of the plurality of the spicules is formed by an edge where the corresponding one of the plurality of the spicules is bent to project away from the inner face of the sheet material, wherein the first vertex, the second vertex, and the first side of each of the plurality of the spicules define a portion of a circumference of a corresponding one of the plurality of the perforations, and wherein the second side and the third side of each of the plurality of the spicules meet at the corresponding third vertex thereof at a position spaced apart from the corresponding first side thereof and the circumference of the corresponding one of the plurality of the perforations;
    (b) placing the hot food item on the inner face of the sheet material; and
    (c) folding the sheet material around the hot food item with the plurality of the spicules engaging an outer surface of the hot food item to enable lateral migration of steam from the hot food item through the plurality of the perforations.

24. The method according to claim 23, wherein the thickness of the sheet material is about 160 microns.

25. The method according to claim 23, wherein the sheet material is a silicone coated paper.

26. The method according to claim 23, wherein each of the plurality of the perforations has a diameter of between 250 and 300 microns and each of the plurality of the spicules has a length of about 125-150 microns, and wherein the length of each of the plurality of the spicules corresponds to a distance from the first side thereof to the third vertex thereof along an axis arranged perpendicular to the first side thereof and extending through the third vertex thereof.

27. The method according to claim 23, wherein the sheet material has between about 31 and 50 perforations/cm$^2$.

28. The method according to claim 23, wherein the hot food item is selected from the group consisting of sandwiches, wraps, tacos, gyros, hamburgers, hot dogs, french fries, crisp fried meats, vegetables, and cheeses.

29. The method according to claim 23, wherein the hot food item is a toasted bread sandwich.

30. A method of forming a three dimensional package for a hot food item, the method comprising the steps of:
(a) providing a sheet material;
(b) forming a plurality of perforations extending through the sheet material between an inner face of the sheet material adapted to contact the hot food item, and an opposite, outer face of the sheet material, wherein each of the plurality of the perforations is surrounded by a plurality of spicules, wherein each of the plurality of the spicules is formed by a bent portion of the sheet material extending in a direction the inner face of the sheet material faces, wherein each of the plurality of the spicules is triangular in shape and includes a first vertex, a second vertex, a third vertex, a first side extending between the first vertex and the second vertex, a second side extending between the second vertex and the third vertex, and a third side extending between the first vertex and the third vertex, wherein the first side of each of the plurality of the spicules is formed by an edge where the corresponding one of the plurality of the spicules is bent to project away from the inner face of the sheet material, wherein the first vertex, the second vertex, and the first side of each of the plurality of the spicules define a portion of a circumference of a corresponding one of the plurality of the perforations, and wherein the second side and the third side of each of the plurality of the spicules meet at the corresponding third vertex thereof at a position spaced apart from the corresponding first side thereof and the circumference of the corresponding one of the plurality of the perforations; and
(c) forming the sheet material into the three dimensional package wherein the three dimensional package extends at least partially around the hot food item with the plurality of the spicules engaging an outer surface of the hot food item to enable lateral migration of steam from the hot food item and through the plurality of the perforations.

31. The method according to claim 30, wherein the step of providing the sheet material includes the step of providing the sheet material with a thickness of about 160 microns.

32. The method according to claim 30, wherein the step of providing the sheet material includes the step of providing a silicone coated paper.

33. The method according to claim 30, wherein the step of providing the sheet material includes the step of providing the sheet material with each of the plurality of the perforations having a diameter of between 250 and 300 microns and with each of the plurality of the spicules having a length of about 125-150 microns, wherein the length of each of the plurality of the spicules corresponds to a distance from the first side thereof to the third vertex thereof along an axis arranged perpendicular to the first side thereof and extending through the third vertex thereof.

34. The method according to claim 30, wherein the sheet material has between about 31 and 50 perforations/cm$^2$.

35. The method according to claim 30, and including the step of pre-constructing the package ready for use.

36. The method according to claim 30, and including the step of constructing the package at the time of use from a pre-cut, pre-assembled package precursor.

37. The method according to claim 30, wherein the hot food item is selected from the group consisting of sandwiches, wraps, tacos, gyros, hamburgers, hot dogs, french fries, crisp fried meats, vegetables, and cheeses.

* * * * *